United States Patent [19]

Lambeth

[11] 4,168,962
[45] Sep. 25, 1979

[54] PLANT GROWTH MEDIA

[75] Inventor: Victor N. Lambeth, Columbia, Mo.

[73] Assignee: The Curators of the University of Missouri, Columbia, Mo.

[21] Appl. No.: 928,801

[22] Filed: Jul. 28, 1978

Related U.S. Application Data

[63] Continuation-in-part of Ser. No. 706,693, Jul. 19, 1976, abandoned.

[51] Int. Cl.² .............................................. C05D 9/00
[52] U.S. Cl. ............................................ 71/31; 71/61; 71/64 A; 71/64 G; 71/DIG. 1; 47/74
[58] Field of Search .................... 71/1, 27, 28, 30, 31, 71/54, 61, 64 A, 64 B, 64 F, 64 G, DIG. 1; 47/1 A, 9, 48.5, 74, 77, DIG. 10

[56] References Cited

U.S. PATENT DOCUMENTS

| | | | |
|---|---|---|---|
| 2,785,969 | 3/1957 | Clawson | 71/64 A |
| 2,791,496 | 5/1957 | Rice | 47/DIG. 10 |
| 2,909,869 | 10/1959 | Dresser | 47/9 |
| 3,062,637 | 11/1962 | Marples | 71/64 F |
| 3,172,752 | 3/1965 | Pierce | 71/64 F |
| 3,323,898 | 6/1967 | Pierce | 71/1 |
| 3,333,940 | 8/1967 | Ridgeway | 71/28 |
| 3,357,814 | 12/1967 | Getsinger | 71/64 F |
| 3,369,884 | 2/1968 | Barron | 71/28 |
| 4,014,675 | 3/1977 | Osburn | 71/31 |

FOREIGN PATENT DOCUMENTS

| | | | |
|---|---|---|---|
| 555532 | 4/1958 | Canada | 71/1 |
| 609413 | 11/1960 | Canada | 71/1 |
| 47-21446 | 9/1961 | Japan | 71/64 F |

OTHER PUBLICATIONS

Soil Fertility and Fertilizers, Tisdale, New York, The MacMillan Co., 3rd Printing, 1960, 80.

*Primary Examiner*—Charles N. Hart
*Assistant Examiner*—Ernest G. Therkorn
*Attorney, Agent, or Firm*—Ray E. Snyder

[57] ABSTRACT

Plant growth media are described as composed of various combinations of vermiculite, perlite, and clay and having superior properties for use as potting soil for container-grown plants. Such media are characterized by greater moisture capillarity and available moisture retention. There is also less danger of plant injury through nutrient deficiencies, over-fertilization, of pH changes. Such media are also characterized by their dry state physical properties in the form of non-compacting, light weight, non-vitreous, rigid foam structures. The dry state media have plant nutrients uniformly distributed throughout and fixed in place. These properties make the media superior for wet-casting into plant containers or extruding into pellets. After filling and upon drying, the media-containers can be inverted without dislodging their contents and the media can be repeatedly wetted and dried while maintaining the desired foam structure.

3 Claims, 1 Drawing Figure

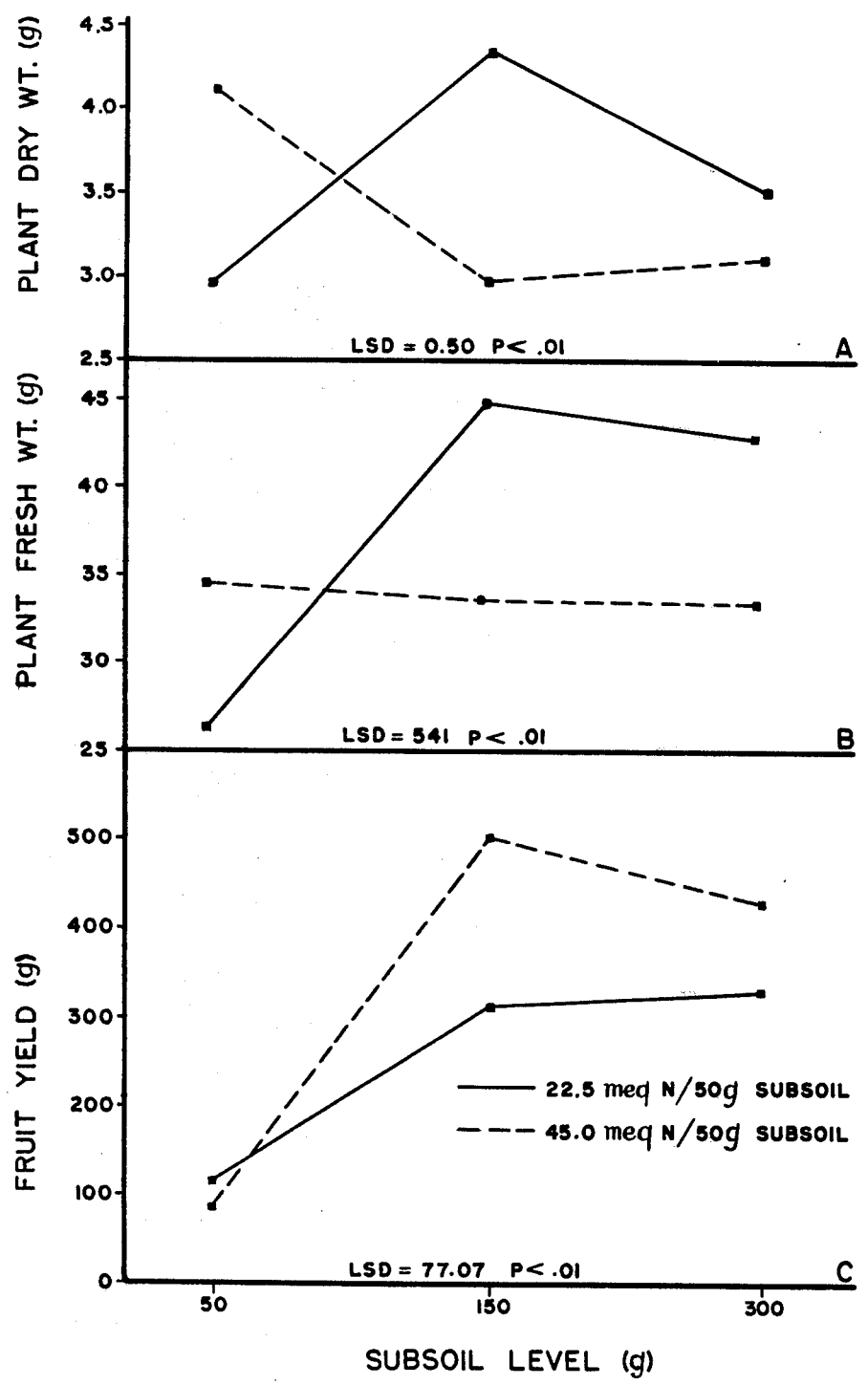

PLANT GROWTH MEDIA

CROSS REFERENCES

This application is a continuation-in-part of application Ser. No. 706,693, filed July 19, 1976, now abandoned.

BACKGROUND OF THE INVENTION

1. Field of the Invention

This invention relates generally to the field of fertilizer chemistry, and more particularly to products and compositions for regulating plant growth.

2. Description of the Prior Art

Favorable growth media have been obtained by amending subsoil clay with quartz sand or by adding clay to quartz or loamy sands (Albrecht[1]; Albrecht and Schroeder[2]; and Del Vale et al.[3]).

Vermiculite and perlite as amendments have also improved media physical properties and plant growth (Dunham[4]; Hayes & Simpson[6]; Mansell et al.[8]; and Warren & Tunny[13]).

Peat vermiculite and peat-perlite mixtures have been developed for commercial plant growing (Sheldrake et al [11,12]); however, the amendment of these materials with clay has not been reported.

Soilless media generally have low fertility reserves and as nutrient levels are increased, salinity pH and toxicity troubles appear because of insufficient buffering capacity. Trace element imbalances are frequent problems as well. Peat-like mixes are also difficult to wet and they possess low reserves of moisture available to the plant.

Growth media used heretofore in seed-media pots or trays have generally been granular in form, tend to shift within the container in shipment, compact when wet, and shrink away from the container walls when dried. Such growth media are generally intended as germination bedding with the intent of transplating to larger containers and different growth media at a later stage of plant growth. Such starting media are generally incapable of supporting horticultural plant growth to maturity without additional fertilizer applications.

Growth media of the general type have also been described in the patent art. The patent to Clawson, U.S. Pat. No. 2,785,969 teaches a seed planting package consisting of a water retaining medium such as Haydite, vermiculite, pumice and wood pulp chips to which fertilizers are added and held together by an organic binder such as gelatin, methylated cellulose, agar, peat moss and paper. Clawson's mixture is placed in a smelter and heated to a molten mass and then fritted in water. His final product is a fused synthetic vitreous matrix.

The use of vermiculite and perlite to facilitate seed germination and seedling growth has also been described in the patent to Dresser, U.S. Pat. No. 2,909,869. Dresser teaches the use of vermiculite and perlite in direct field seeding of tomato seeds and the like to prevent crusting over of the surface of the soil, which inhibits growth.

Colloidal clay has also been used to form bonded agricultural granules as taught in the patent to Marples, et al. U.S. Pat. No. 3,062,637. These bonded granules are intended to be used as carriers for plant nutrients, herbicides, algicides, and/or insecticidal toxicants. The granular structure facilitates distribution to a site and their hard surface resists attrition in handling.

Clay has been used since the dawn of history as a binder to form bricks and the like, but has never been regarded as a desirable medium for growing plants.

SUMMARY OF THE INVENTION

It is an object of the present invention to provide improved plant growth media containing vermiculite and perlite by incorporating high-exchange clays to form a rigid foam-like matrix having greater capillarity and available moisture retention and fertility reserves than conventional mixes. The improved growth media are also characterized by greater buffering capacity so as to resist excessive pH changes and the salinity and toxicity effects that follow from the addition of increased levels of nutrients.

It is an additional object to provide improved plant growth media of the type described to which slow-release nutrients are added in the preparation of the media so as to make feasible the complete container-growing of horicultural plants without additional fertilization. Consequently, such media require less attention and skill in management.

The media are prepared by slacking the clay with water to form a slurry to which nutrients in soluble form are added. Nutrient formulations may be custom-tailored to meet specific plant species needs. The vermiculite and perlite are added in increments to form a desired consistency. The mixture can then be wet-cast into plant containers or extruded into pellets and dried.

The wet mixture can be piped to remote locations, in the manner of piping wet concrete. Seeds or seedlings can be plated immediately in the wet mixture. Alternatively, the mixture can be dried and seeds imbedded in a dry state. Then water only need be added to germinate the seeds and support plant growth.

The dried and pelleted form of the media can be placed in a container and slacked with water repeatedly without separation of the components.

The extremely high capillarity of the media permits plants to be grown to maturity on wet pads or by other sub-irrigation methods thereby eliminating the need for top watering.

The multiple advantages of the present growth media significantly reduce the attention required and thereby reduce the labor costs involved in conventional feeding and watering of horticultural plants.

BRIEF DESCRIPTION OF THE DRAWING

The FIGURE is a multiple graph illustrating the influence of clay containing subsoil and nitrogen levels on tomato plant dry weight (A) and plant fresh weight (B) at 42 days; and fruit yield (C) at 112 days.

DESCRIPTION OF THE PREFERRED EMBODIMENTS

Materials and Methods

The preliminary experimental procedures leading to the discovery of the superiority of the improved plant growth media of the present invention is set forth in the examples that follow:

EXAMPLE I (Prior Art)

Factorially designed treatments consisting of three levels of Putnam subsoil (50 g, 150 g, & 300 g), a constant level (4.7 liters before mixing) of four vermiculite-perlite (V-P) ratios by volume (V:P 4:0, 3:1, 2:1, 1:1) and two rates of N(22.5 & 45$_{meq}$/50 g subsoil), provided by NH$_4$NO$_3$ and ureaformaldehyde in a 1:2 ratio, were arranged in randomized block design with five replications. Other nutrients were maintained constant: P and 15$_{meq}$/50 g subsoil; K, Ca, and Mg at 10%, 75%, and 13% respectively, of the subsoil's cation-exchange capacity (CEC).

The V-P-Clay treatments were compared to an equal volume of Cornell peat-lite mix A (Sheldrake & Boodley[11,12]). Jars of 3.8 liter capacity containing the media were positioned within each of the randomized blocks. Both the VPC and peat-lite media received only initial fertilization in order to establish N needs for the particular container-grown tomato plants (*Lycopersicon esculentrum* Mill. cv. Patio Hybrid).

Approximate mixture weights, adjusted to oven-dry (105° C.) basis, of air-dried subsoil (Putnam silt loam; B22 horizon; 2% sand, 15% coarse silt, 25% fine silt, 58% clay (Beidellite); CEC 28.6 meq/100 g; bulk density 1.22 g cc; % pore space 52.71, % moisture at $-\frac{1}{3}$ bar 28.93; at $-15$ bar 17.11) were slackened overnight with demineralized water in glazed ceramic jars. Aliquots of nutrient solutions required to establish the nutrient levels were then buretted into the jars, the cation additions being based on recommended percentages saturation of the subsoil's exchange capacity (Lambeth[7]). V and P were then mixed in the required volume ratios and the V-P mixes added in small increments to the jars of nutrient-laden subsoil while blending with a mixer or beater. Demineralized water was added incrementally so that the mixture was kept fluid to ensure homogeneity. Upon drying, the media possessed a honey-combed structure, the individual V-P particles being coated and held together by the nutrient-laden clay.

Media physical properties as determined by established mechanical analysis and pressure membrane techniques are shown in Table I.

Two Patio Hybrid tomato seedlings were transplanted initially into each 3.8 liter jar, 3 weeks after sowing in vermiculite. Moisture levels were maintained in a favorable range (50% available moisture-field capacity) by frequent additions of demineralized water. Greenhouse temperature was maintained at 24°±4° C. One plant from each jar was harvested 42 days from seeding (transplant size) and its fresh and dry plant weights determined. Fruit weight and fresh and dry plant weights for the remaining plant in each jar were determined 112 days from seeding.

RESULTS AND DISCUSSION

For the long-term period (112 days), as shown in Table II, both subsoil and N rates affected fruit yield, and fresh and dry plant weights. Three- and fourfold increases in fruit yield were obtained by increasing the subsoil from 50 g to the 150 g or 300 g level. Fresh and dry plant weights increased with each increment of subsoil, and high N rate (45 meq/50 g subsoil) increased both growth and fruit yield. Also, at 112 days a subsoil N interaction was observed only for fruit yield, also shown in FIG. 1. Fruit yields were greatly enhanced at the higher subsoil levels, and at the high N rate. Only fruit yield was affected by the V-P ratio, the 1:1 ratio giving the highest yield (Table II).

Although the differences were rather small, increasing the subsoil content for a given V-P mixture increased the bulk density and concomitantly reduced the pore space, as set forth in Table I. With cropping, the V-only subsoil mixes showed greater increase in bulk density (more compacting) than those media containing perlite, among which little difference was observed. The value of perlite addition in counteracting the tendency of V to compact and become soggy with time has been reported previously (Mansell et al.[8]).

In general, growth and fruiting in the Cornell peat-lite mix corresponded closely with that at the 150 g and 300 g subsoil levels, 1:1 V-P ratio, and high N rate. Individual treatment combinations of 1:1 V-P ratio and high N rate at 150 g and 300 g subsoil resulted in 23.22 and 15.84% higher fruit yields respectively, than the Cornell peat-lite mix A (Table II) (Pill 1971[9]). The principal limitation of the peat-lite mix was its low available moisture (16.24%) as compared to that for the subsoil-amended media, which averaged 39.18% (Table I). The percentage moisture in the peat-lite mix retained at tensions greater than $-15$ bars and unavailable to plants was two to three times greater than in the subsoil-amended media.

These preliminary experiments have shown that VPC mixtures may be superior to the Cornell peat-lite mix A as container growth media under conditions of low cultural maintenance owing to their greater available moisture retention. Additionally, less danger of plant injury through over-fertilization exists due to the greater exchange capacity and hence greater buffering capacity of VPC mixes.

These preliminary experiments have also demonstrated the feasibility of providing a near ideal potting mixture for both home grown and hot-house grown horticultural plants. Various peat-perlite-vermiculite mixtures are currently used commercially, but they are difficult to wet and are known to compact and become soggy when wet. They also shrink upon drying and hence draw away from the walls of their container. These properties make them less than ideal for use in prepared pots, particularly those that require shipment.

Vermiculite alone and perlite alone are granular in nature and do not hold together by themselves. In prepared pots and trays, such mixes tend to shift and settle in shipment and dry fertilizers intermixed therewith tend to become unevenly distributed. Both vermiculite and perlite are characterized by low density and high porosity, which are desirable properties, but these materials provide only minimal nutrients to support plant growth.

Vermiculite and perlite are not interchangeable ingredients in a growth medium since they have contrasting water holding and releasing properties. Vermiculite absorbs and releases large quantities of water while perlite facilitates drainage and aeration. Perlite also serves to stabilize the structure by reducing shrinkage and swelling of the expanded vermiculite. Perlite also contains excessive fluorine for best plant growth.

The amendment of vermiculite and perlite with clay, as described herein, has been found to produce a potting mixture that is characterized by several desirable physical and chemical properties. The mixture is prepared in a wet state and extruded into pellets or poured into growing containers and dried to a rigid foam matrix with minimal shirnkage. The pellets can be dried and packaged for shipment. To put into use, the pellets can be poured into a container and slacked with water to form an instant complete plant growth media. The media-filled containers can be inverted and jarred without disloding the contents in both wet and dried states.

The solid foam structure can be dried in a standard sized pot, removed as a unit for shipment, and replaced in a similar size pot for growing. Seeds can be added to the dried mixture and shipped as a ready-to-grow unit; only light and water need be added to initiate and support growth. Because of the tremendous capillarity of the media, plants can be grown to maturity on wet-pads or by sub-irrigation thereby eliminating the need for top watering. Slow release nitrogen and other fertilizers tailored or customized for particular plant needs can be incorporated initially in the near exact amount required to support plant growth to maturity. Transplanting to other containers with different soil mixes can be totally eliminated.

Vermiculite is an expanded form of multiple layers of mica. The surfaces of each layer carry a plurality of negative charges. These charges serve as sites for attachment of positively charged nutrient ions (e.g. $Fe^{+++}$, $K^+$, $Ca^{++}$, $Mg^{++}$, $NH_4^+$). These nutrients are uniformly intermixed with the clay slurry which also carries a net negative charge. The combination of the clay slurry, with the vermiculite produces an attachment and electrical balancing of the charges described, and results in a uniformly distributed storehouse of nutrients. The electrical attachment of these ions forms a matrix that is not separated by repeated watering. In addition, the nutrients are present in proper proportions throughout the media.

Both vermiculite and perlite are characterized by pourous structure with relatively large pore spaces. The addition of the clay slurry to the vermiculite and perlite coats and partially fills the pore spaces. This in turn decreases the size of the pores and thereby greatly increases the capillarity of the media.

In a preferred embodiment of the invention, the clay to be used is the proportion of Beidellite type substantially as found in the B22 horizon of Missouri Putnam silt loam subsoil. This subsoil is slaked with water and stirred to form a thin slurry. Liquid nutrients are added before or during the stirring process. The stirring is continued for a sufficient time to ensure uniform distribution of the nutrients throughout the slurry. The total nutrients added comprise less than 2% by weight of the final media in a dry state.

Vermiculite and perlite are added in increments while stirring in desired amounts and proportions so as to form a light-weight composite mixture. The ratios of vermiculite to perlite added to the slurry can range from 3:1 to 1:1 on a volume basis. In a wet state, the water constitutes a substantial portion of the total weight of the mixture. In a dry state the weights of the components are in the ranges of clay: 25%–45%
vermiculite: 35%–55%
perlite: 15%–35%
fertilizer salts: less than 2%

The resultant dry mixtures have a rigid foam-like structure to which only water need be added to make suitable growth media. It is to be noted that the final growth media is totally inorganic in composition. A slight possible deviation from this characterization might be by way of minute amounts of organic fertilizers or traces of organic matter in the clay. These are considered as too minute to be considered as elements of the total composition.

BIBLIOGRAPHY

1. ALBRECHT, W. A. 1946. Colloidal-clay cultures, preparation of the clay and procedures in its use as a growth medium. Soil Sci. 62: 23–31.
2. ALBRECHT, W. A. and SCHROEDER, R. A. 1939. Colloidal-clay cultures for refined control of nutritional experiments with vegetables. Proc. Am. Soc. Hort. Sci. 37: 689–692.
3. DEL VALE, C. G., WORLEY, R. E. and HARMON, S. A. 1967. Influence of Attapulgus clay on the mineral content of turnips grown in soil and sand media. Proc. Am. Soc. Hort. Sci. 90: 342–348.
4. DUNHAM, C. W. 1967. Nutrition of greenhouse crops in soils with added peat moss and vermiculite. Proc. Am. Soc. Hort. Sci. 90: 462–466.
5. HALTERLEIN, A. J., and LAMBETH, V. N. 1975. Effect of controlled release fertilizers on blossom-end rot incidence in *Lycopersicon esculentum* cv. Patio Hybrid. HortScience, Vol. 10 (1).
6. HAYES, S. F. and SIMPSON, K. 1955. Micacious materials in pot-plant production. Gardener's Chronicle 138: 210–212.
7. LAMBETH, V. N. 1955. Cationic saturation of low exchange soils for growth of vegetable crops. U. of Mo. Res. Bull. 575.
8. MANSELL, R. L., ROSE, G. W., and RICHARDSON, B. 1968. Comparative growth rates of turnip seedlings (*Brassica rapa.* L.) in vermiculite-perlite mixtures. Proc. Am. Soc. Hort. Sci. 92: 572–577.
9. PILL, W. G. 1971. An evaluation of amended Putnam subsoil as a growth medium, M. S. Thesis, U. of Mo.
10. PILL, W. G. and LAMBETH, V. N. 1975. Vermiculite-Perlite-Clay mixtures as container growth media. Can. J. Plant. Sci. 55: 771–774 (July 1975).
11. SHELDRAKE, R. and BOODLEY, J. W. 1965. Commercial production of vegetable and flower plants. Cornell Univ. Ext. Bull. 1056.
12. SHELDRAKE, R. and BOODLEY, J. W. 1972. Cornell peat-lite mixes for commercial plant growing. Cornell U. Infm. Bull. 43.
13. WARREN, W. J. and TUNNY, J. 1965. Defects of perlite as a medium for plant growth. Aust. J. Exp. Agr. Anim. Husb. 5: 137–140.

TABLE I

Physical Properties of Media Before and After Cropping

| Treatment | | | Before Cropping* | | After Cropping* | |
|---|---|---|---|---|---|---|
| Putnam Subsoil (g) | V:P (vol) | Available moisture** (%) | Bulk density (g/cc) | Pore space (%) | Bulk density (g/cc) | Pore space (%) |
| 50 | 4:0 | 46.1 | 0.25 | 90.4 | 0.34 | 86.9 |
| 150 | 4:0 | 40.5 | 0.27 | 89.6 | 0.40 | 84.6 |
| 300 | 4:0 | 41.5 | 0.34 | 86.9 | 0.46 | 82.3 |
| 50 | 3:1 | 40.8 | 0.26 | 90.0 | 0.30 | 88.5 |
| 150 | 3:1 | 40.7 | 0.31 | 88.1 | 0.33 | 87.3 |
| 300 | 3:1 | 37.1 | 0.32 | 86.8 | 0.41 | 84.2 |
| 50 | 2:1 | 39.7 | 0.24 | 90.8 | 0.29 | 88.9 |
| 150 | 2:1 | 37.8 | 0.27 | 89.6 | 0.31 | 88.1 |
| 300 | 2:1 | 37.2 | 0.31 | 88.1 | 0.34 | 86.9 |
| 50 | 1:1 | 36.7 | 0.27 | 89.2 | 0.31 | 88.1 |
| 150 | 1:1 | 35.4 | 0.30 | 88.5 | 0.34 | 86.9 |
| 300 | 1:1 | 36.8 | 0.34 | 86.9 | 0.37 | 85.8 |

*Means represent five determinations.
**Means represent three determinations.
Cornell peat-lite mix = 16.24% available moisture.

TABLE II

Effects of Media on Growth and Fruiting of Patio Hybrid Tomato

| Treatment number | Treatment Code[1] | | | Mean Yield | | |
|---|---|---|---|---|---|---|
| | S | A | N | g Fruits | g Fresh Weight | g Dry Weight |
| 1  | 1 | 4 | 1 | 60.05  | 34.48  | 7.46 |
| 2  |   |   | 2 | 0.90   | 71.44  | 17.20 |
| 3  |   | 3 | 1 | 128.64 | 46.65  | 12.25 |
| 4  |   |   | 2 | 94.68  | 66.60  | 15.56 |
| 5  |   | 2 | 1 | 91.43  | 46.12  | 11.27 |
| 6  |   |   | 2 | 124.17 | 85.80  | 18.59 |
| 7  |   | 1 | 1 | 163.26 | 62.41  | 15.41 |
| 8  |   |   | 2 | 114.80 | 71.07  | 17.80 |
| 9  | 2 | 4 | 1 | 204.19 | 107.64 | 24.17 |
| 10 |   |   | 2 | 498.68 | 154.12 | 32.87 |
| 11 |   | 3 | 1 | 368.53 | 139.30 | 30.38 |
| 12 |   |   | 2 | 414.26 | 208.78 | 36.92 |
| 13 |   | 2 | 1 | 274.67 | 129.68 | 27.55 |
| 14 |   |   | 2 | 527.46 | 190.56 | 37.06 |
| 15 |   | 1 | 1 | 408.46 | 127.82 | 27.31 |
| 16 |   |   | 2 | 555.58 | 192.25 | 41.16 |
| 17 | 3 | 4 | 1 | 328.89 | 161.73 | 34.37 |
| 18 |   |   | 2 | 454.67 | 168.62 | 36.27 |
| 19 |   | 3 | 1 | 275.90 | 186.20 | 44.02 |
| 20 |   |   | 2 | 423.24 | 185.46 | 41.48 |
| 21 |   | 2 | 1 | 354.96 | 137.14 | 31.19 |
| 22 |   |   | 2 | 293.79 | 202.20 | 39.52 |
| 23 |   | 1 | 1 | 348.71 | 149.99 | 32.08 |
| 24 |   |   | 2 | 522.30 | 254.47 | 47.53 |
| 25 | Cornell Peat-Lite | | | 450.88 | 213.52 | 48.24 |

[1](S) Subsoil 1 50 g
2 150 g
3 300 g
(A) Amendment 4 V4PO
3 V3P1
2 V2P1
1 V1P1
(N) Nitrogen 1 22.5 me. N/50g subsoil (2:1 UF:NH$_4$NO$_3$)
2 45.0 me. N/50g subsoil (2:1 UF:NH$_4$NO$_3$)

I claim:

1. A non-organic plant growth media for the container growing of plants comprising:

a mixture of vermiculite and perlite characterized by large pore spaces and distributed uniformly throughout the media, mixed together at a ratio in the range of 3:1 to 1:1, and constituting amounts by weight of the dry media of 35% to 55% and 15% to 35%, respectively; and a non-organic clay binder, constituting 25% to 45% by weight of the dry media, which has been added in a wet state to blend uniformly with said vermiculite and perlite to form a light-weight, rigid foam structure in a dry state wherein said clay partially fills said pore spaces and whereby the moisture capillarity of the media is significantly increased.

2. The plant growth media of claim 1 wherein said vermiculite has a plurality of layers of surfaces carrying net negative electrical charges; and fertilizer salts constituting less than 2% of the dry weight of the media and carrying net positive electrical charges are blended uniformly within said clay binder and attach to the negative charges on the vermiculite surfaces, thereby providing a uniformly distributed fertilizer reservoir throughout the media.

3. An improved non-organic plant growth media prepared by the steps of:

selecting a clay subsoil containing more than 50% Beidellite type clay;

slackening said clay subsoil with water and blending in a mixer to form a thin slurry;

adding mineral fertilizer salts to the slurry as it is being blended in an amount less than 2% by weight of the slurry; and adding vermiculite and perlite to the slurry as it is being blended in mixture ratios in the range of 3:1 to 1:1 and in amounts in the ranges of 35% to 55% by weight and 15% to 35%, respectively, of the final dry weight to form in a dry state a stable rigid foam matrix characterized by high capillarity and available moisture retention and having fertilizer uniformly distributed throughout the media.

* * * * *